(12) United States Patent
Kircher et al.

(10) Patent No.: US 9,738,370 B2
(45) Date of Patent: Aug. 22, 2017

(54) INTERIOR TRIM ARRANGEMENT FOR AN AIRCRAFT CABIN

(71) Applicant: Airbus Operations GmbH, Hamburg (DE)

(72) Inventors: Benedikt Kircher, Hamburg (DE); Stephan Sontag, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 77 days.

(21) Appl. No.: 14/619,690

(22) Filed: Feb. 11, 2015

(65) Prior Publication Data

US 2015/0232167 A1    Aug. 20, 2015

(30) Foreign Application Priority Data

Feb. 14, 2014  (DE) .................. 10 2014 202 751

(51) Int. Cl.
*B64C 1/00*  (2006.01)
*B64C 1/06*  (2006.01)
(Continued)

(52) U.S. Cl.
CPC .............. *B64C 1/066* (2013.01); *B64D 11/00* (2013.01); *B64D 47/02* (2013.01); *B64D 2011/0038* (2013.01)

(58) Field of Classification Search
CPC . B64C 1/066; B64C 2011/0038; B64C 47/02; B64C 11/00; B60Q 3/02; B60Q 3/025
See application file for complete search history.

(56) References Cited

U.S. PATENT DOCUMENTS 2,229,145 A  *  1/1941  Stewart .................. B60Q 3/025
                                                 362/479
2,536,799 A     1/1951  Divizia
(Continued)

FOREIGN PATENT DOCUMENTS

DE        3713466 A1    11/1988
DE     19825269 C2      4/2001
(Continued)

OTHER PUBLICATIONS

Search Report for German Application No. DE 10 2014 202 783.7 dated Nov. 6, 2014.
(Continued)

*Primary Examiner* — Philip J Bonzell
(74) *Attorney, Agent, or Firm* — Jenkins, Wilson, Taylor & Hunt, P.A.

(57) ABSTRACT

An interior trim arrangement for an aircraft cabin, having lateral ceiling elements, and an angled element having limbs limb extending from one another, one lateral ceiling element arranged offset upwardly and to a first side, the angled element arranged with the first limb adjoining a lateral ceiling element towards the first side, the free end of the first limb located opposite the free end, towards the first side, of a lateral ceiling element, the other limb extending towards the other lateral ceiling element, the free end of the second limb spaced apart from the first free end, towards a lateral ceiling element, of the other lateral ceiling element, a light source for the other lateral ceiling element between the free end of the second limb and the first free end, towards a lateral ceiling element, of the other lateral ceiling element, and the angled element having a lighting element.

11 Claims, 3 Drawing Sheets

(51) Int. Cl.
*B64D 11/00* (2006.01)
*B64D 47/02* (2006.01)

(56) References Cited

U.S. PATENT DOCUMENTS

| | | | | |
|---|---|---|---|---|
| 2,582,738 | A | * | 1/1952 | Arenberg ............ B60Q 3/025 362/483 |
| 3,210,875 | A | * | 10/1965 | Schwenkler ......... B60Q 3/025 362/479 |
| 3,211,904 | A | * | 10/1965 | Schwenkler ......... B60Q 3/025 362/224 |
| 3,358,134 | A | * | 12/1967 | Gonyea ............. B60Q 3/0253 362/483 |
| 4,081,665 | A | * | 3/1978 | Corbeil ............. B60Q 3/025 362/223 |
| 5,113,322 | A | * | 5/1992 | Mikalonis ........... B60Q 3/025 362/224 |
| 5,129,597 | A | | 7/1992 | Manthey |
| 5,558,425 | A | * | 9/1996 | Pons ............... B60Q 3/0279 362/220 |
| 6,158,690 | A | | 12/2000 | Wadey et al. |
| 6,547,184 | B2 | | 4/2003 | Nieberle |
| 7,703,956 | B2 | | 4/2010 | Wentland |
| 7,896,530 | B2 | * | 3/2011 | Budinger ........... A61N 5/0618 362/471 |
| 8,814,093 | B2 | | 8/2014 | Wuggetzer et al. |
| 9,051,051 | B1 | | 6/2015 | Biedscheid |
| 2001/0050519 | A1 | | 12/2001 | Kasuya |
| 2002/0041144 | A1 | | 4/2002 | Fujishiro |
| 2005/0135093 | A1 | | 6/2005 | Alexanderson |
| 2005/0211841 | A1 | | 9/2005 | Guard |
| 2006/0237585 | A1 | | 10/2006 | Lau et al. |
| 2007/0102577 | A1 | | 5/2007 | Saint-James |
| 2007/0109802 | A1 | | 5/2007 | Bryan |
| 2008/0219013 | A1 | * | 9/2008 | Budinger ........... A61N 5/0618 362/471 |
| 2008/0266886 | A1 | | 10/2008 | Wentland |
| 2009/0230245 | A1 | | 9/2009 | Mosler |
| 2009/0308977 | A1 | | 12/2009 | Larcher |
| 2010/0014009 | A1 | | 1/2010 | Stavaeus et al. |
| 2010/0157615 | A1 | | 6/2010 | Gruhlke |
| 2012/0156420 | A1 | | 6/2012 | Greiner |
| 2012/0224382 | A1 | | 9/2012 | Petersohn et al. |
| 2014/0368113 | A1 | | 12/2014 | Eckel |
| 2015/0151850 | A1 | | 6/2015 | Eakins |
| 2015/0232166 | A1 | | 8/2015 | Kircher et al. |
| 2015/0232199 | A1 | | 8/2015 | Kircher et al. |

FOREIGN PATENT DOCUMENTS

| | | |
|---|---|---|
| DE | 10149194 A1 | 6/2002 |
| DE | 10231324 A1 | 1/2004 |
| DE | 10 2004/051146 A1 | 5/2006 |
| DE | 20 2007/006707 U1 | 7/2007 |
| DE | 10 2006/007285 A1 | 8/2007 |
| DE | 10 2007/020397 A1 | 10/2008 |
| DE | 10 2009/04 597 A1 | 3/2011 |
| DE | 10 2011/013206 A1 | 9/2012 |
| EP | 1288123 B1 | 3/2005 |

OTHER PUBLICATIONS

Search Report for German Application No. DE 10 2014 202 753.5 dated Nov. 5, 2014.
Non-Final Office Action for U.S. Appl. No. 14/619,705 dated Apr. 5, 2016.
Non-Final Office Action for U.S. Appl. No. 14/619,509 dated Jun. 28, 2016.
Notice of Allowance for U.S. Appl. No. 14/619,705 dated Mar. 14, 2017.
Final Office Action for U.S. Appl. No. 14/619,705 dated Dec. 2, 2016.
Final Office Action for U.S. Appl. No. 14/619,509 dated Dec. 29, 2016.
Non-Final Office Action for U.S. Appl. No. 14/619,509 dated Jun. 26, 2017.

* cited by examiner

INTERIOR TRIM ARRANGEMENT FOR AN AIRCRAFT CABIN

CROSS-REFERENCE TO RELATED APPLICATION

This application claims priority to German Patent Application No. 10 2014 202 751.9 filed Feb. 14, 2014, the entire disclosure of which is incorporated by reference herein.

TECHNICAL FIELD

The subject matter disclosed herein relates to an interior trim arrangement, in particular for an aircraft cabin which extends rectilinearly along a cabin axis.

BACKGROUND

Interior trim arrangements for aircraft cabins are well known from the prior art and serve primarily to screen the interior of the cabin of an aircraft from load-bearing elements, insulating elements, supply systems etc. provided in the lateral region and in the upper region.

Lighting devices have to be provided in the region of the interior trim arrangement in order to illuminate the cabin interior. Here, it is desirable for these lighting devices to be configured such that they not only light the cabin interior in a simple manner but are also suitable for illuminating the cabin in a particularly advantageous manner from an aesthetic point of view or for providing passengers moving through the cabin with information for example in the form of projections.

Here, it is frequently desirable for lighting elements to be arranged in a concealed manner and behind trim elements in a manner not normally visible to passengers, such that they indirectly illuminate the cabin. This means that light emerging from a lighting element is first of all reflected at a trim element before it propagates through the cabin interior.

However, this results in the problem that, in particular in the upper lateral region and in the ceiling of an aircraft cabin, relatively little space is available for the interior trim, and so the lighting elements in question, which are intended to work indirectly, have to be arranged in a very space-saving manner.

The problem of little space arises to a more pronounced extent in particular in the region of doors of the aircraft cabin. Furthermore, particularly aesthetically pleasing conditions are intended to be created precisely in this region in order to give the passenger a particular impression when just entering the cabin and for example to allow an airline to express its company identity for instance by way of its own logo or to display information relating to the destination or seating directions (for instance business class to the left, economy class to the right).

SUMMARY

Therefore, proceeding from the prior art, it is an object of the subject matter disclosed herein to create an interior trim arrangement in particular for an aircraft cabin, with which even relatively complex lighting conditions can be created in a space-saving manner.

According to the subject matter disclosed herein, this object is achieved by an interior trim arrangement, wherein the trim arrangement has a first lateral ceiling element, a second lateral ceiling element and an angled element having a first limb and a second limb which extend away from one another at an angle, wherein the second lateral ceiling element is arranged in a manner offset upwardly and to a first side with respect to the first lateral ceiling element, wherein the angled element is arranged such that the first limb adjoins the first lateral ceiling element towards the first side and extends preferably in the same plane.

The second limb then extends upwardly towards the second lateral ceiling element, wherein an intermediate space is formed in the direction of the first side between the free end of the second limb and the first free end of the second lateral ceiling element, which points towards the first lateral ceiling element, i.e. the free end of the second limb is spaced apart in the horizontal direction from the first free end of the second lateral ceiling element, which is arranged adjacent to the first lateral ceiling element, such that an intermediate space is provided between these free ends and thus between the angled element and the second lateral ceiling element.

Arranged in this intermediate space is a light source which is directed towards the second lateral ceiling element, thereby creating indirect lighting, by way of which the aircraft cabin can be illuminated and in particular the ceiling region can be lit up.

According to the subject matter disclosed herein, provision is also made for the angled element itself to have an additional lighting element by way of which it is possible to generate direct light which is directed in particular at monuments located in front of the angled element, for example a kitchen arrangement or cabinets, in the aircraft cabin. Moreover, light from this lighting element can be directed onto the floor in front of the angled element.

This lighting element is provided although the space available therefor is comparatively small and the angled element thus has to extend further into the cabin interior towards the cabin longitudinal axis than would be absolutely necessary if no lighting element were present. However, as a result it is possible for aesthetically pleasing lighting scenarios to be created in the region of doors above which the angled element is provided.

Here, it should be noted that, in the context of the subject matter disclosed herein, the limbs of the angled element do not have to extend rectilinearly but can also have a curved cross section as seen perpendicularly to the direction of extension of the limbs and the angled element. In this case, the angle between the limbs is then defined by the angle which tangential planes to the limbs enclose with one another, the tangential planes each being applied to the limbs at the free ends of the latter.

In a preferred embodiment, the angled element is configured such that the angle at which the first and second limb extend is between 80° and 120°. Then, at least the second limb, which extends in the direction of the second lateral ceiling element, is arranged such that a lighting element which is arranged adjacent thereto can shine substantially horizontally into the cabin and thus in particular monuments which are provided adjacent to a door region can be lit. In this case, the space that is available for the lighting element is nevertheless sufficiently large.

It is furthermore preferred for the first and/or second limb to be formed at least sectionally in a transparent manner and for the lighting element then to be arranged within the space delimited by the limbs. In this way, both the floor and monuments adjacent to the angled element can be lit, a single lighting element sufficing to this end.

It is also conceivable for the angled element to be formed in a transparent manner additionally or exclusively in the region of the connecting line along which the two limbs are connected together. In this case, too, the lighting element can be arranged adjacent to the connecting line in the space between the limbs. This likewise allows a space-saving arrangement which allows flexible illumination of the cabin space.

In accordance with a further preferred embodiment, the lighting element is formed such that it has a lighting source, and a mask element is arranged between the lighting source and the first and/or second limb of the angled element, the mask element imparting a contour on a light beam generated by the lighting source, the contour becoming visible when the light beam strikes a surface transversely to the direction of propagation of the light beam. In particular, the lighting element can be configured as what is referred to as a GOBO ("Graphical Optical Black-Out"), in which the mask is arranged in front of the actual light source of the lighting element such that a pattern is generated in the manner of a slide projector, the pattern being reproduced on the irradiated surface. In this way, necessary information for the passengers can be projected onto surfaces located in front of the angled element, such as the floor or wall surfaces of a monument, in particular temporarily, for example during boarding.

Furthermore, the angled element can be configured such that it has a transparent section which extends in the plane of the first and/or second limb, i.e. the transparent section can for example also extend over a connecting line between the first limb and the second limb. Provision is further made on the transparent section of a coupling section which extends out of the plane of the first or second limb into the space between the first and second limb, wherein provision is made of a diffused-light source which is located directly opposite the coupling section.

In this way, it is possible as a result of the diffused-light source for the transparent section as a whole to be perceived by diffusion as a luminous element when the diffused-light source is switched on. If, however, it is switched off, given a suitable choice of the colour of the transparent section, a passenger will not perceive that the transparent section is a light source. This is particularly advantageous for aesthetic reasons.

It is further preferred for the first lateral ceiling element, the second lateral ceiling element and the angled element to be configured such that they extend along an axis that extends perpendicularly to the direction of the first side and in the process preferably have a constant cross-sectional shape.

The first side is the side in the direction of which the second ceiling element is offset with respect to the first lateral ceiling element, that is to say that direction which points towards the center axis when the internal trim arrangement is installed in an aircraft cabin.

If the elements of the internal trim arrangement now have a constant cross-sectional shape along an axis which is perpendicular to this direction, this means that their cross-sectional shape does not change parallel to the cabin axis. Thus, a plurality of these arrangements can easily be fitted in succession on the cabin wall without the individual elements having to be modified. However, it may also be sufficient for the elements to have an identical cross section at both ends. This makes it possible to arrange identical elements in succession without there being jumps or steps at the joints between adjacent elements, but rather the elements rest against one another in a matching manner. Moreover, this is associated with aesthetic advantages.

In this connection, it should also be noted that in the case of an angled element that extends along the above-defined axis over a relatively great length, the lighting element can have a multiplicity of lighting sources arranged in succession along this axis.

Further, it is preferred for the second lateral ceiling element, which is arranged above the first lateral ceiling element and laterally offset with respect thereto, to have a first and a second section, wherein the first free end, pointing towards the first lateral ceiling element, is arranged on the first section and the second free end, pointing away from the first lateral ceiling element, of the second lateral ceiling element is arranged on the second section. Finally, tangential planes, which are applied to the sections in each case at the free ends, can then extend at an angle which is between 90° and 140°. The consequence of this is then that the first portion, pointing towards the first lateral ceiling element, extends virtually vertically, and so a favourable installation situation is produced for the light source with which the second lateral ceiling element is illuminated. This is the case in particular when the first tangential plane intersects the first lateral ceiling element or the first limb of the angled element.

BRIEF DESCRIPTION OF THE DRAWINGS

The subject matter disclosed herein is explained in the following text with reference to a drawing showing a merely preferred exemplary embodiments, wherein

FIG. 1 illustrates an aircraft cabin in cross section in the region of a door, and FIG. 2 shows an enlarged illustration of the region of the ceiling of the interior trim arrangement from FIG. 1. In this case, the aircraft cabin extends rectilinearly along a cabin axis KA.

Figure 1:
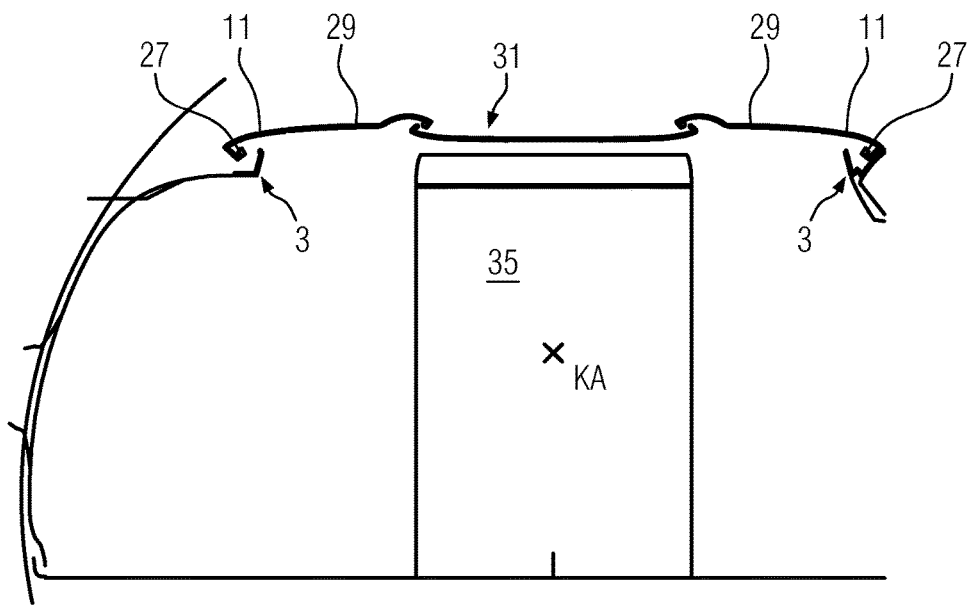
FIG. 1 shows a cross section through an aircraft cabin with an interior trim arrangement according to the subject matter disclosed herein.

It can be gathered from these two illustrations that the interior trim arrangement has a first lateral ceiling element 1 in the region of the ceiling, the lateral ceiling element 1 extending substantially horizontally in a slightly curved manner. The first lateral ceiling element 1 is adjoined towards a first side, which points towards the cabin axis KA, by an angled element 3 which has a first limb 5 and a second limb 7. The limbs 5, 7 extend at an angle relative to one another and are connected together along a connecting line 9. The angle between the first and the second limb 5, 7 is 105° in this preferred exemplary embodiment, and thus in the range between 80° and 120°.

Above the first lateral ceiling element 1 and laterally offset in the direction of the first side towards the cabin axis KA with respect thereto, provision is made of a second lateral ceiling element 11 which comprises a first section 13 and a second section 15. The second lateral ceiling element 11 is furthermore arranged relative to the first lateral ceiling element 1 such that the free end 17 arranged on the first section 13 and pointing towards the first lateral ceiling element 1 is located above the first lateral ceiling element 1 and such that a first tangential plane 19, which is applied to the first section 13 at the first free end 17, intersects the first lateral ceiling element 1.

Furthermore, a second tangential plane 21, which is applied to the second section 15 of the second lateral ceiling element 11 at the second free end 23, which is arranged on the second section 15 and points away from the first lateral ceiling element 1, extends at an angle to the first tangential plane 19. In the present exemplary embodiment, this angle is 127° and is thus in the range between 90° and 140°.

Figure 2:
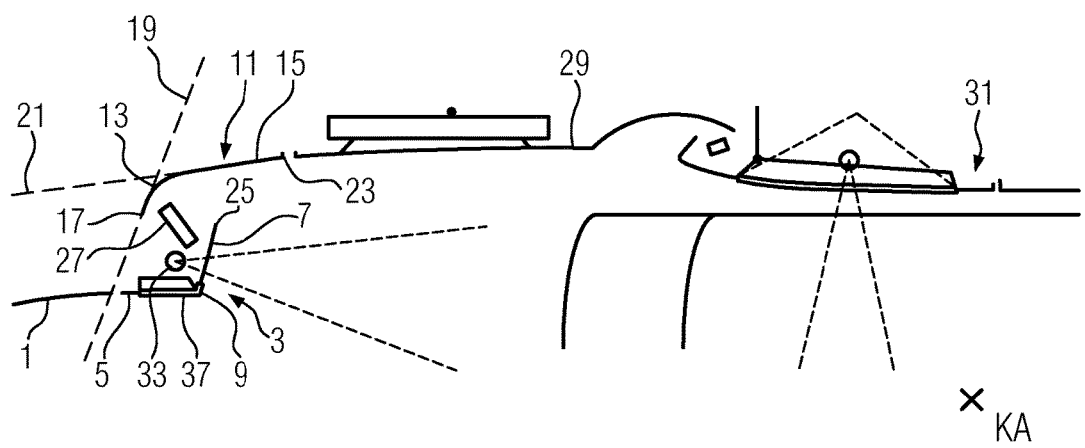
FIG. 2 shows an enlarged illustration of a cross-sectional view of the interior trim arrangement according to the subject matter disclosed herein.

As is furthermore clearly apparent in FIG. 2, the first free end 17 of the second lateral ceiling element 11 and the free end 25 of the second limb 7 of the angled element 3 are spaced apart from one another in the direction of the first side, that is to say towards the cabin axis KA, such that between the free end 25 of the second limb 7 and the first free end 17 of the second lateral ceiling element 11, provision is made of an intermediate space. Arranged in this intermediate space is a light source 27 which is oriented such that it illuminates the second lateral ceiling element 11 and furthermore also a central ceiling element 29 arranged on that side of the second lateral ceiling element 11 that is remote from the first lateral ceiling element 1.

The arrangement of the light source 27 in the intermediate space between the first free end 17 of the second lateral ceiling element 11 and the free end 25 of the second limb 7 of the angled element 3 has the advantage that it is possible for passengers entering the aircraft cabin not to be exposed to direct lighting from the light sources 27. Rather, the latter are arranged in a concealed manner with respect to the passengers.

At this point, it should also be noted that in the exemplary embodiment described here, the first lateral ceiling element 1, the second lateral ceiling element 11 and the angled element 3 extend rectilinearly along an axis which extends perpendicularly to the direction of the first side and thus parallel to the cabin axis KA, and in part have a constant cross-sectional shape along this axis.

In the exemplary embodiment of an interior trim arrangement described here, the central ceiling element 29 is also adjoined by a ceiling panel element 31 which is likewise provided with lighting elements, but is not intended to be described in more detail here.

As is already apparent from FIG. 2, the angled element 3 is provided with a lighting element 33 which is arranged in the space between the limbs 5, 7 of the angled element 3 and is configured such that light emitted thereby falls on a monument 35 located opposite the angled element 3. The monument 35 can be a cabinet or kitchen arrangement in the central region of the cabin.

Figure 3:
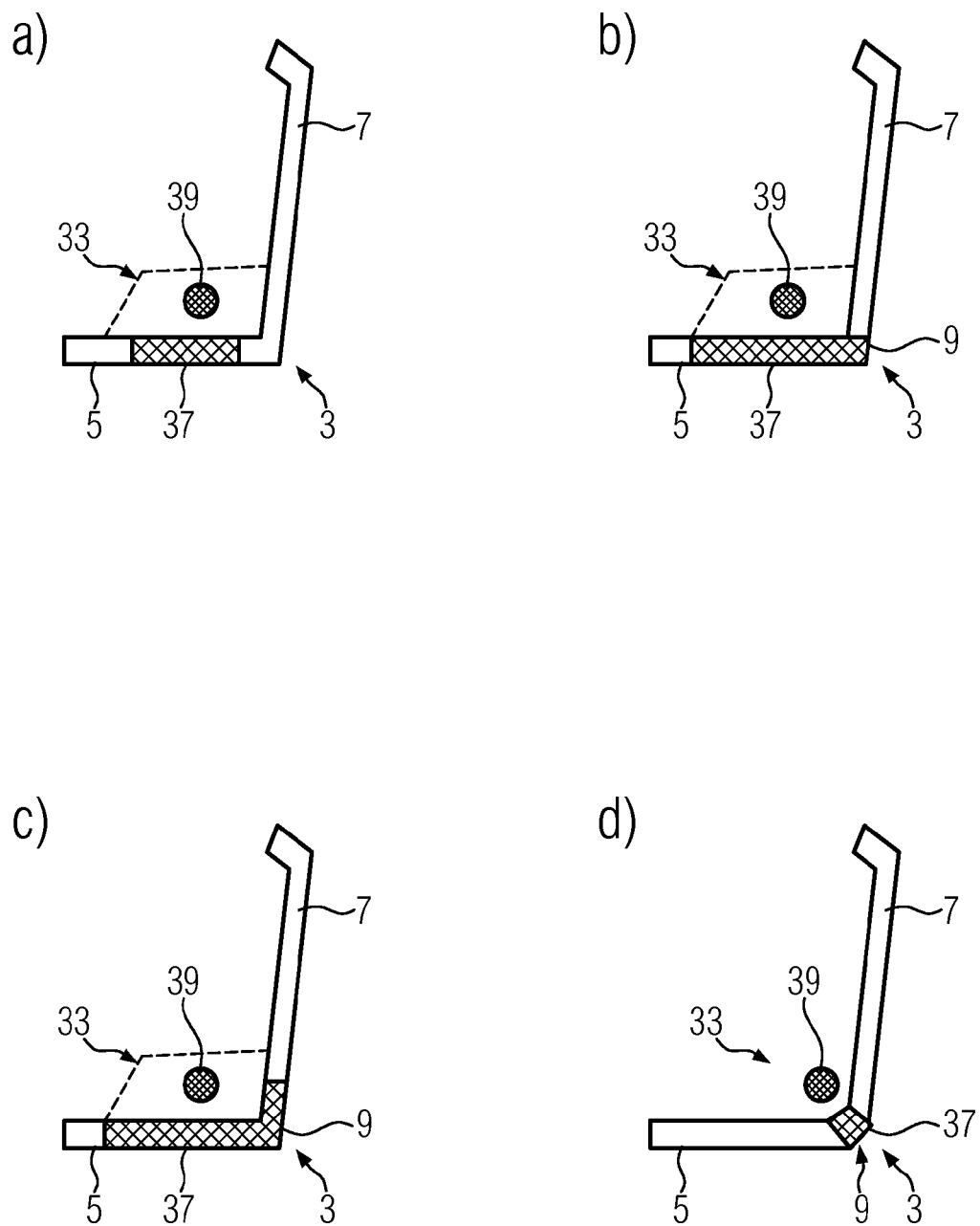
FIGS. 3 and 4 show cross-sectional views of embodiments of the angled element for the exemplary embodiment in FIGS. 1 and 2.
Figure 4:
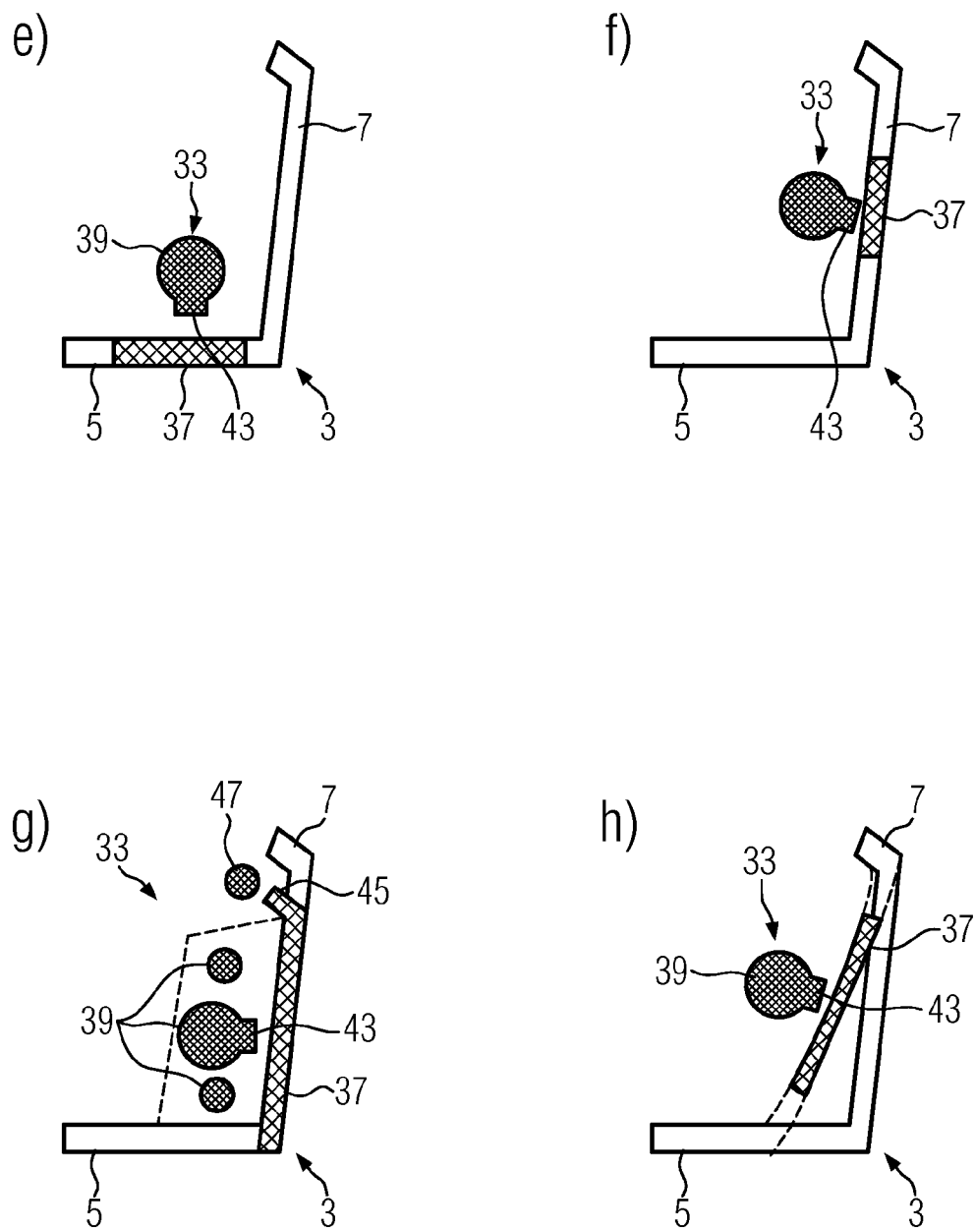

The angled element 3 and the lighting element 33 arranged thereon can be configured in multifarious ways, and FIGS. 3 and 4 illustrate various embodiments of the angled element 3 and of the lighting element 33 arranged thereon.

In the embodiment in part a) of FIG. 3, the angled element 3 is configured such that the first limb 5 is provided with a transparent section 37 which extends along a part of the first limb 5 and substantially along the entire length of the angled element 3. Provided as lighting element 33 directly above the transparent section 37 is at least one lighting source 39 which is thus arranged in the space between the limbs 5, 7 of the angled element 3, and the light emitted thereby shines through the transparent section 37. In such an arrangement of transparent section 37 and lighting source 39, the region of the floor beneath the angled element 3 is lit thereby.

If, as in the exemplary embodiment described here, the lateral ceiling elements 1, 11 and the angled element 3 extend along the cabin axis KA over a relatively great length, the lighting element 33 can comprise a multiplicity of lighting sources 39 arranged in succession along the cabin axis. This applies for all the embodiments of the angled element 3 that are described here in the following text.

In the case of the exemplary embodiment of an angled element 3 illustrated in part b) of FIG. 3, the transparent section 37 extends along the first limb 5 as far as the connecting line 9 between the first limb 5 and the second limb 7. Otherwise the arrangement corresponds to the one in part a) of FIG. 3, and so, here too, the at least one lighting source 39, when it is switched on, lights the floor region beneath the angled element 3.

In the case of the embodiment of the angled element 3 in part c) of FIG. 3, the transparent region 37 of the angled element 3 extends beyond the connecting line 9 between the first limb 5 and the second limb 7 and into the second limb 7 such that light which comes from the lighting sources 39 arranged therebehind can also strike a monument 35, such as a cabinet or kitchen arrangement, that is arranged opposite the angled element 3.

Finally, in the case of the embodiment of an angled element 3 illustrated in part d) of FIG. 3, the transparent section 37 is provided merely in the region of the connecting line 9 between the first limb 5 and the second limb 7, such that light emitted by the lighting source 39 shines at an angle directed forwards onto the floor.

In the case of the embodiment of an angled element 3 illustrated in part e) of FIG. 4, a transparent section 37 is provided in the first limb 5, and the lighting element 33 is formed such that a mask element 43 is provided between the transparent section 37 and a lighting source 39, the mask element 43 being formed such that a contour is applied to the light beam emitted by the lighting source 39, the contour being recognizable on the surface irradiated by the light beam, and the arrangement of lighting source 39 and mask element 43 can be formed in particular as what is referred to as a GOBO ("Graphical Optical Black-Out").

This means that the light spot which is in this case created on the floor beneath the angled element 3 has a pattern by way of which it is possible to indicate to the passenger located therebeneath the direction in which he should move on, for example. Alternatively, it is also possible as a result to project simple patterns onto the floor. Here, too, a plurality of arrangements of lighting source 39 and mask element 43 can be fitted in succession on the angled element 3 along the length thereof.

The embodiment in part f) of FIG. 4 is formed in a similar manner to that in part e) with the difference that in this case the transparent region 37 is formed in the second limb 7, and so the pattern created by the mask element 43 is then projected onto a monument 35.

In the embodiment in part g) of FIG. 4, the transparent section 37 is formed in the second limb 7 and thus points at a monument 35 arranged in front of the angled element 3, the monument 35 then being irradiated by the lighting sources 39 arranged in the angled element 3.

In this case, a mask element 43 is once again fitted in front of one of the lighting sources 39, such that here, too, a pattern is projected onto a monument and at the same time diffuse lighting can be created with the aid of the further lighting sources 39.

The transparent section 37 extends initially along the plane of the second limb 7 and furthermore has a coupling section 45, wherein a diffused-light source 47 is provided directly opposite the coupling section 45. If the diffused-light source 47 is switched on, light is irradiated laterally into the coupling section 45 and furthermore by diffusion into the entire transparent section 37 such that the latter lights up completely.

In the above-described embodiments, the first and the second limb 5, 7 of the angled element 3 extend rectilinearly. However, it is also conceivable for the limbs to have a curved profile. In such a case, the angle that the limbs enclose with one another would be determined by the angle that tangential planes applied to the two limbs at the free ends thereof enclose with one another.

The embodiment shown in part h) of FIG. 4 shows an angled element 3 in which the transparent section 37 formed in the second limb 7 is set back with respect to the lateral peripheral regions of the second limb 7, and so this angled element 3, in contrast to the above-described ones, does not have a constant cross-sectional shape along the length of the angled element 3. Here, too, the lighting element 33 is formed by an arrangement of at least one lighting source 39 and a mask element 43, such that here, too, a pattern can be projected onto a monument 35 arranged in front of the angled element 3.

While, in the above-described embodiments of angled elements 3 a lighting source 39 is used alone or in combination with a mask element 43 in the lighting element 33, it is also conceivable for projectors to be fitted in the angled element 3, the projectors projecting complex, and optionally also moving pictures onto the floor or wall surfaces of monuments arranged in front of the angled element 3.

As is clear from the description of the exemplary embodiment, the configuration of the interior trim arrangement according to the subject matter disclosed herein and in particular the provision of a lighting element 33 on the angled element 3 makes it possible to light the region of this interior trim arrangement in a flexible manner and to achieve aesthetically pleasing effects, even though there are considerable restrictions with regard to the space available therefor.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An interior trim arrangement for a passenger cabin of an aircraft, in particular for an aircraft cabin which extends rectilinearly along a cabin axis,
    wherein the interior trim arrangement has a first lateral ceiling element, a second lateral ceiling element and an angled element having a first limb and a second limb which extend away from one another at an angle,
    wherein the second lateral ceiling element is arranged in a manner offset upwardly and to a first side with respect to the first lateral ceiling element,
    wherein the angled element is arranged such that the first limb adjoins the first lateral ceiling element towards the first side, such that a free end of the first limb is located opposite a free end of the first lateral ceiling element, which points towards the first side, and such that the second limb extends towards the second lateral ceiling element, wherein a free end of the second limb is spaced apart in a direction of the first side from a first free end of the second lateral ceiling element, which points towards the first lateral ceiling element,
    wherein a light source directed towards the second lateral ceiling element is provided between the free end of the second limb of the angled element and the first free end of the second lateral ceiling element, which points towards the first lateral ceiling element, and
    wherein the angled element has a lighting element.

2. The interior trim arrangement according to claim 1, wherein the angle at which the first and second limbs extend is between 80° and 120°.

3. The interior trim arrangement according to claim 1, wherein the first limb and/or the second limb are formed in a sectionally transparent manner, and
    wherein the lighting element is arranged in the space delimited by the first and second limb.

4. The interior trim arrangement according to claim 1, wherein the angled element is formed in a transparent manner in the region of a connecting line along which the first and the second limb are connected together, and
    wherein the lighting element is arranged adjacent to the connecting line in the space delimited by the first and second limb.

5. The interior trim arrangement according to claim 1, wherein the lighting element has a lighting source, and a mask element is arranged between the lighting source and the first and/or second limb of the angled element, the mask element imparting a contour on a light beam generated by the lighting source, the contour becoming visible when the light beam strikes a surface.

6. The interior trim arrangement according to claim 1, wherein the first and second limb of the angled element extend along planes,
    wherein the angled element has a transparent section which extends in a plane of the first and/or second limb,
    wherein a coupling section is on the transparent section and extends out of the plane of the first or second limb into the space between the first and second limb,
    wherein a diffused-light source is provided opposite the coupling section.

7. The interior trim arrangement according to claim 1, wherein the first lateral ceiling element, the second lateral ceiling element and the angled element have a constant cross-sectional shape along an axis which extends perpendicularly to the direction of the first side.

8. The interior trim arrangement according to claim 1, wherein:
    the second lateral ceiling element has a first section and a second section,
    the first section comprises the first free end of the second lateral ceiling element, which points towards the first lateral ceiling element,
    the second section comprises a second free end of the second lateral ceiling element, which points away from the first lateral ceiling element,
    a first tangential plane applied at the first free end to the first section and a second tangential plane applied at the second free end to the second section extend at an angle to one another, and
    the angle is between 90° and 140°.

9. The interior trim arrangement according to claim 8, wherein the first tangential plane intersects the first lateral ceiling element or the first limb of the angled element.

10. An aircraft having an aircraft cabin which extends rectilinearly along a cabin axis and has at least one interior trim arrangement according to claim 1.

11. The aircraft according to claim 10, wherein the cabin axis and an axis of the at least one interior trim arrangement extend parallel to one another.

* * * * *